Figure 1:
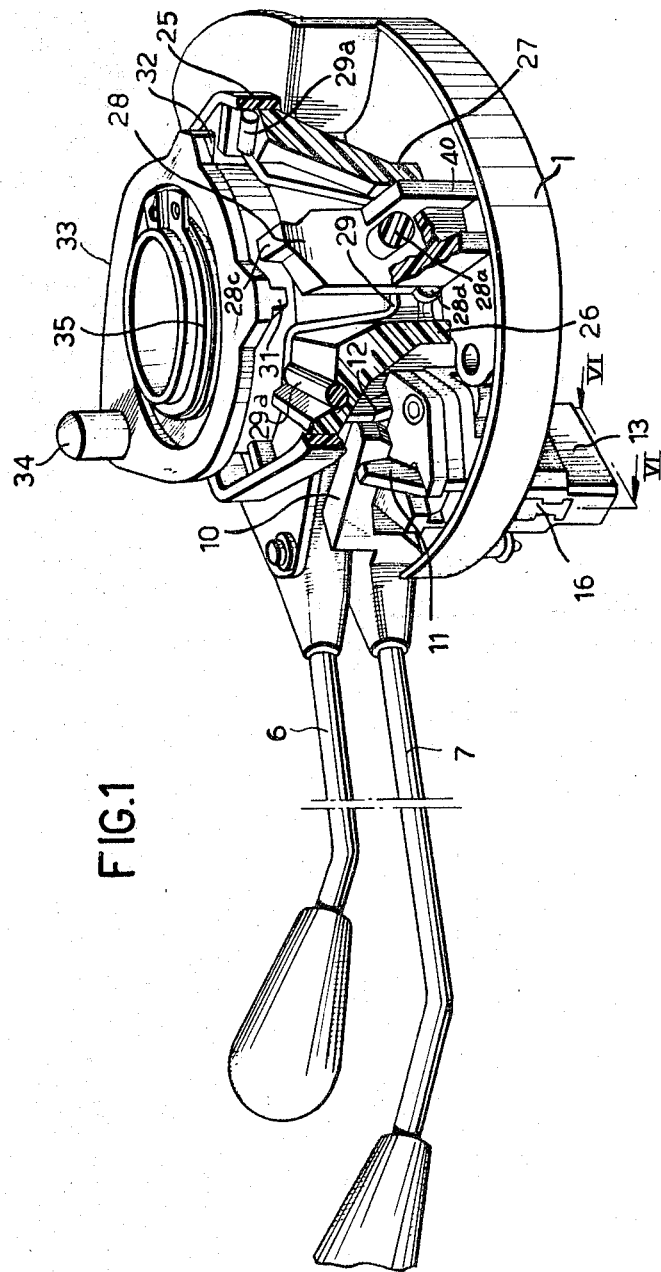

Sept. 28, 1965  M. VITALONI ETAL  3,209,092
TURN INDICATOR SWITCH
Filed March 19, 1963  3 Sheets-Sheet 2
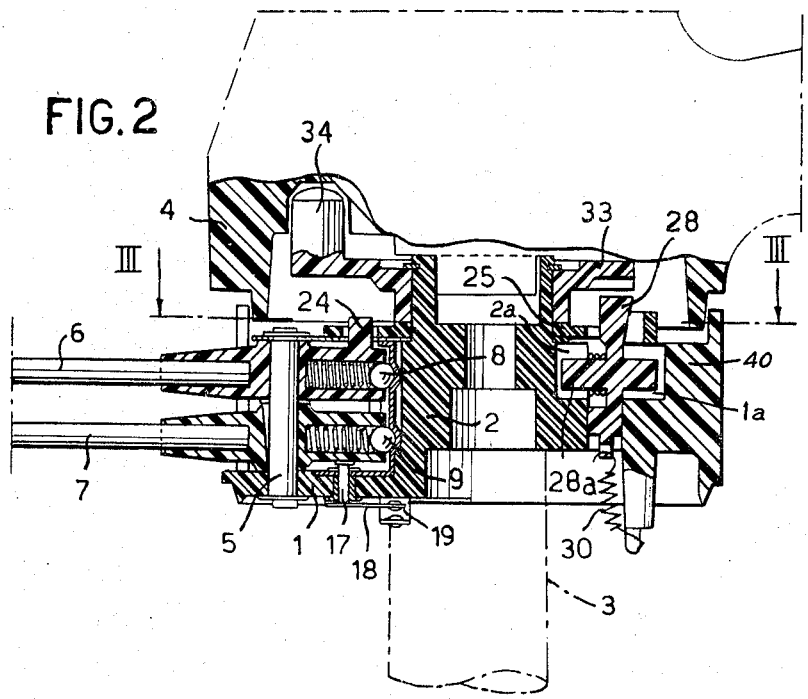
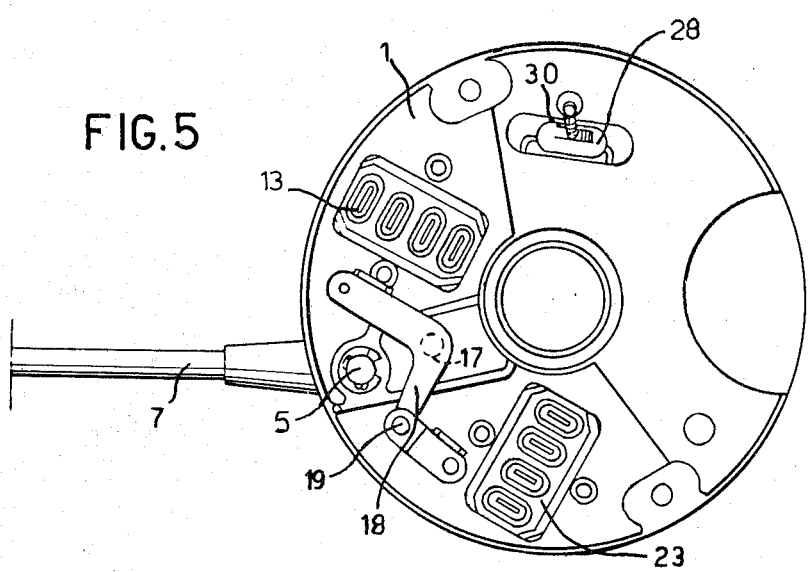

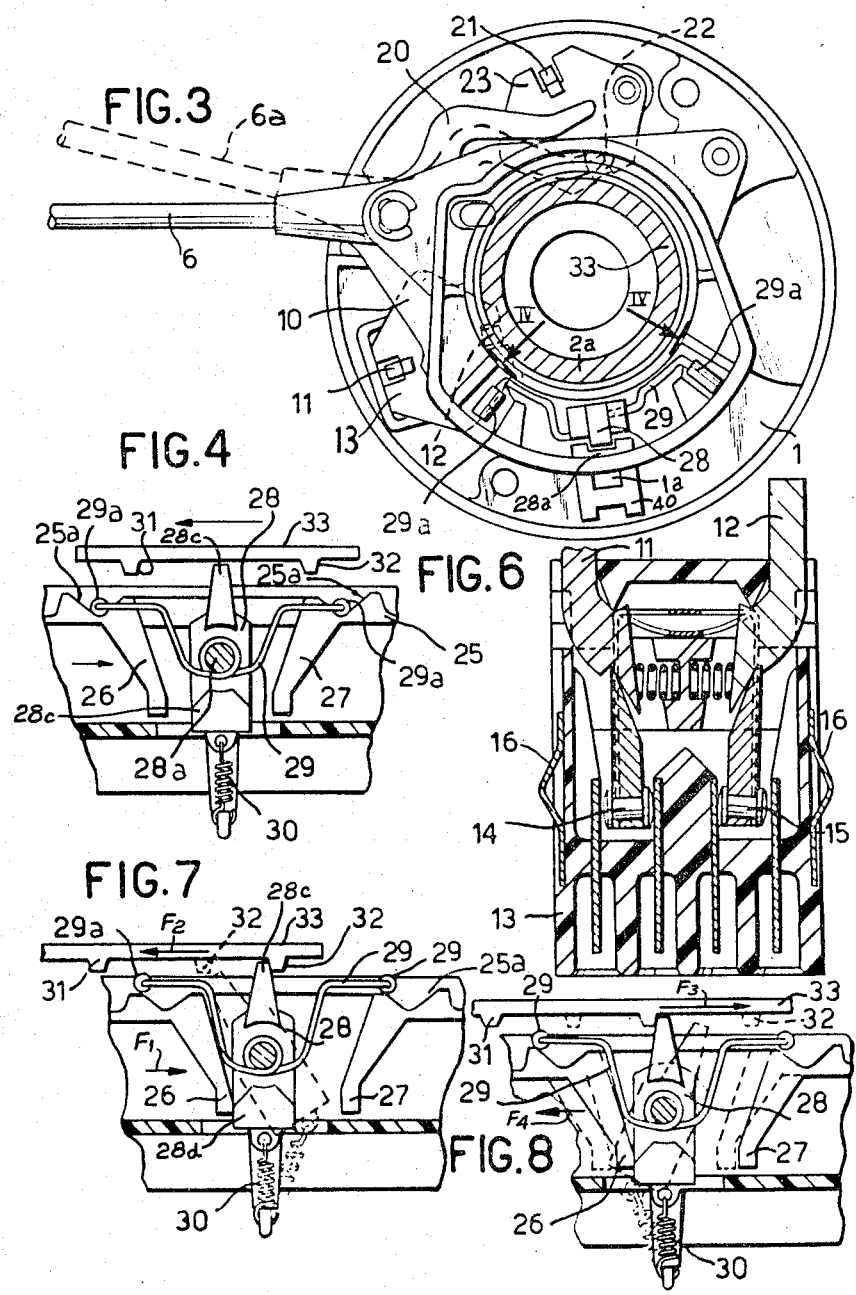

United States Patent Office 3,209,092
Patented Sept. 28, 1965

3,209,092
TURN INDICATOR SWITCH
Mario Vitaloni and Giovanni Vitaloni, Turin, Italy,
assignors to Fratelli Vitaloni, Turin, Italy
Filed Mar. 19, 1963, Ser. No. 266,439
Claims priority, application Italy, June 15, 1962,
11,930/62
11 Claims. (Cl. 200—61.34)

This invention relates to a device for controlling the self-cancelling turn indicators and switching over lights, arranged on the steering wheel of a motor vehicle.

The device comprises two swing levers, one of which is adapted to control the turn indicators and cooperates with means which return it to its central inoperative position during restoring of the steering mechanism after driving over a curve.

The main object of this invention is to provide an apparatus combining all component members requiring accurate machining within narrow allowances, in order to facilitate coupling of the device with the steering wheel hub.

A further object of this invention is to provide a device in which the members automatically restoring the turn indicators are not subject to jamming, whichever is the position of the steering wheel at the moment the turn indicators are operated, as may happen in devices known heretofore.

Finally, the invention provides a device in which sliding contacts adopted in known constructions are avoided, whereby the contacts can be easily replaced without removing other parts of the device.

The main characteristic feature of the improved device consists in the provision of a ring rotatable about the body portion of the device, provided with means for angular connection with the steering wheel hub by which it is rotated, and carrying two projections adapted to cooperate with a swinging and floating pawl in order to restore the operating lever for the turn indicators to its inoperative position during return of the steering mechanism into its straight drive position.

The ring is provided with a peg extending upwardly towards the steering wheel hub, adapted to fit into a recess in the hub in order to connect the device with the steering mechanism.

A further characteristic feature of this invention resides in the fact that the pawl adapted to restore the operating lever for the turn indicators is mounted for oscillation about a pivot radially extending with respect to the steering pillar, resiliently yieldable in a direction parallel with the steering wheel axis.

Further characteristic features of this invention will be understood from the appended detailed description referring to the accompanying drawings which show by way of a non-limiting example an embodiment thereof.

FIGURE 1 is a perspective view of the device,
FIGURE 2 is a vertical sectional view,
FIGURE 3 is a sectional view on line III—III of FIGURE 2,
FIGURE 4 is a part sectional view on line IV—IV of FIG. 3,
FIGURE 5 is a view from below of the device,
FIGURE 6 is a detailed sectional view taken along line VI—VI of FIGURE 1, and FIGURES 7 and 8 are two sectional views on line IV—IV of FIGURE 3 at various operating stages.

The housing 1 of the device is substantially in the form of a circular disc having a central hub 2 for coupling with the top of the steering column 3, beneath the hub of the steering wheel 4.

The housing 1 carries a lateral pivot 5 extending parallel with the steering wheel axis, having mounted for oscillation thereon two levers 6, 7 adapted to operate the direction indicators and switch over the vehicle lights, respectively. The levers 6, 7 are provided with sprung balls 8, 9 snapping into the three triangular positions which can be taken by the levers.

The operating lever 7 for switching over the vehicle lights is capable of performing an oscillation through a limited arc in a plane extending through the pivot 5, by virtue of the taper of its seat coupling it with the pivot (FIGURE 2).

The operating lever 7 for switching over the vehicle lights is provided with an extension 10 adapted to cooperate with two push buttons 11, 12 in order to establish the necessary electric contacts for the desired switching over of lights.

The push buttons 11, 12 are carried by a block 13 enclosing two microswitches 14, 15 controlled by the push buttons 11, 12.

The block 13 is laterally provided with two springs 16 for snapping it into its seat in the ring 1. Said springs allow in case of damage to the contacts to easily and quickly replace the block 13.

The main oscillational movement of the lever 7 around the axis of the pivot 5 moves the extension 10 on the lever 7 into contact with the push button 11 or 12, respectively, to thereby operate the microswitch 14 or 15, respectively and effect the desired switching over of the lights.

The secondary oscillation of the lever 7 in a plane extending through the axis of the pivot 5 effects through a piston 17 guided in an axial direction to the housing 1, resilient deformation of a metal plate 18 fitted to the disc bottom, hence closure of the contact 19 effecting flash lighting.

The lever 6 is provided with a lateral extension 20 cooperating with two push buttons 21, 22 associated with a block 23 enclosing two microswitches similar to the microswitches 14, 15, the block being capable to similarly snap into a seat in the ring 1. The angular movement of the lever 6 moves the extension 20 into contact with the push button 21 or 22, to thereby close their associated microswitch and operate the turn indicators.

The lever 6 is moreover connected by a projection 24 with a ring 25 mounted for rotation relative to housing 1 and formed therein with a recess defining a pair of fork-shaped abutments 26 and 27 disposed on opposite sides with sufficient clearance for a tiltable pawl 28.

The pawl 28 is carried by a hairpin spring 29, the middle portion of which is wound around a pivot 28a extending transversely of the middle portion of pawl 28 and arranged radially of the steering column axis. The ends of hairpin spring 29 are bent so as to extend radially outward and are provided with rollers 29a which normally are seated in a pair of corresponding V-shaped grooves 25a. The grooves 25a are formed in ring 25 so as to be radially disposed. Pivot 28a is slidably mounted in guides 2a and 1a the latter being formed in a stop 40. Guides 1a and 2a extend axially of the steering column. Stop 40 is mounted to intersect the circular path of movement of abutments 26 and 27 in order to prevent them from rotating beyond their predetermined operative positions.

The pawl 28 is attached to a spring 30 tending to restore it downwardly.

The top end of the pawl 28 is directed upwardly towards cam means formed with two projections 31, 32 on the lower face of a ring 33 guided around the top of the hub 2 of the device. The ring 33 is moreover provided with an upwardly extending peg 34, adapted to fit into a recess in the steering wheel hub 4. The ring 33, which is held around the hub 2 of the device by an expansible ring 35, is therefore guided about the hub and rotates jointly with the steering wheel by being carried along by the peg 34.

To illustrate the operation of the present turn indicator switch, if a right turn is to be negotiated lever 6 is moved upwardly to its position 6a shown in phantom lines on FIGURE 3. Extension 20 is pivoted to activate push button 20 which produces a signal light indicating that a right turn is to be made. At the same time, ring 25 is moved from its position shown in FIGURE 4 to its position shown in FIGURE 7 so that the lower portion of abutment 26 is rotated to engage the left side of pawl 28 at its base portion 28d. Pawl 28 simultaneously is slightly lifted against the action of spring 30 because ends 29a of spring 29 ride, in a camming movement, up the slopes of grooves 25a. The tip portion 28c of pawl 28 is lifted toward, but does not make contact with, the lower surface of ring 33.

As the vehicle makes its right turn, ring 33 rotates clockwise (viewed in plan) as indicated by arrow $F_2$ shown in FIGURE 7, enabling projection 32 to engage tip 28c and tip pawl 28 counterclockwise. When projection 32 has moved to the left of tip 28c, pawl 28, due to the restoring action of spring 30, returns to its previous erect position. The tilting movement of pawl 28 occurs entirely within a plane disposed parallel with the steering column axis. Abutments 26 and 27 are sufficiently inclined such that when either is in its operative abutting position no interference will result with regard to the desired tilting movements of pawl 28.

In straightening out the steering wheel after completing the right turn, ring 33 is rotated in a reverse direction, counterclockwise for this illustration, so that it may be returned to its original position as indicated by force $F_3$ shown in FIGURE 8. During this reverse rotation projection 32 engages and overrides pawl tip 28c, automatically causing pawl 28 to be tilted clockwise as indicated by the force arrow $F_3$ of FIGURE 8. Simultaneously, the resisting force produced by abutment 26 indicated by force arrow $F_1$ of FIGURE 7 is opposed and overcome by force $F_4$ exerted by pawl base 28d as indicated in FIGURE 8. The resulting push on abutment 26 causes ring 25 to be rotated clockwise to its original inoperative position indicated by FIGURE 3.

Thus when the steering wheel is entirely straightened out, the right directional indicator will have been canceled and lever 6 will have been returned to its original neutral position.

The members cooperating to return the operating lever 6 for the turn indicators to its central inoperative position are all carried by the device, which facilitates assembly of the device and accurate mutual positioning of its component parts.

Since the pawl 28 is floatingly mounted and capable of resiliently yielding in an axial direction, the turn indicators can be freely operated whichever the position of the steering wheel, thereby avoiding the drawback which may arise in prior devices.

It will be understood that, the principle of the invention being left unaltered, embodiment and constructional details can be widely varied with respect to the example described and shown without departing from the scope of this invention.

What we claim is:

1. A direction indicator switch comprising;
a housing,
actuator means connected to said housing,
a ring rotatably mounted on said housing and connected to said actuator for rotation from a neutral position to a pair of operative positions on opposite sides of the neutral position,
a recess formed in said ring,
abutment means defined by said recess,
cam means for canceling an indicated direction rotatably mounted on said housing in coaxial relationship with said ring,
a pawl connected to said housing and ring and positioned intermediate said abutment means for tilting on an axis in opposite directions within a plane parallel to the axis of said ring,
said pawl being formed on one side of its tilting axis with a tip intersecting the path of movement of said cam means and on the other side with a base,
said abutment means upon rotation of said ring to an operative position abutting against said base to restrain the pawl from tilting in one direction,
and said cam means for canceling an indicated direction being rotated to engage and override said tip sufficient to produce a thrust by said base against said abutment means to rotate and restore said ring to its neutral position.

2. A direction indicator switch according to claim 1 wherein said abutment means include a pair of spaced apart fork-shaped abutments diverging toward said cam means in order to provide sufficient tilting clearance for said pawl.

3. A direction indicator switch according to claim 1 including a pivot extending transversely of said pawl connecting said pawl to said ring and defining the tilting axis for said ring.

4. A direction indicator switch according to claim 3 including a hair spring wound at an intermediate position around said pivot and formed with a pair of ends slidably connected to said ring, and an anchoring spring attached to said pawl at one end and said housing at the other end to yieldably urge said pawl away from said cam means.

5. A direction indicator switch according to claim 4 including a pair of rollers mounted on said hair spring ends for rolling in and out of said grooves.

6. A direction indicator switch according to claim 4 wherein said ring has a pair of radially extending grooves for seating said hair spring ends when said ring is in its neutral position,
said hair spring ends upon rotation of said ring to an operative position being forced to slide over the slopes of said grooves to lift said pawl such that its tip intersects the path of movement of said cam means.

7. A direction indicator switch according to claim 6 including a stop mounted on said housing intermediate said abutment means to control within predetermined limits the rotation of said ring,
a guide slot formed in said stop and extending axially relative to said ring axis in order to receive said pivot and guide said pawl when it is lifted and restored.

8. A direction indicator switch according to claim 1 wherein said cam means has a pair of spaced apart projections extending toward said ring means,
one of said projections being adapted to cancel a first indicated direction and the other projection being adapted to cancel a different indicated direction.

9. A direction indicator switch according to claim 1 including a peg mounted eccentrically on said cam means and extending from said ring means into engagement with the hub of a vehicle steering wheel so that said cam means and the hub are fixed for simultaneous rotation.

10. A direction indicator switch according to claim 1 including electrical switch means mounted on said housing and adapted to be actuated by said actuator means to produce a signal corresponding to the indicated direction produced when said ring is rotated to an operative position.

11. A direction indicator switch according to claim 10 including a second actuator said actuator means and said second actuator means being mounted to a common pivot for pivotal movement, connected to said housing, second electrical switch means mounted to said housing for controlling switching over lights of a vehicle, said second actuator means when actuated adapted to produce a change in condition of the lights.

References Cited by the Examiner
UNITED STATES PATENTS

| | | | |
|---|---|---|---|
| 2,848,573 | 8/58 | Barcus | 200—61.34 |
| 2,957,057 | 10/60 | Pinsenchaum | 200—61.54 |

FOREIGN PATENTS 496,475  7/54  Italy.

BERNARD A. GILHEANY, *Primary Examiner.*

ROBERT K. SCHAEFER, *Examiner.*